US008729873B2

(12) United States Patent
Goto

(10) Patent No.: US 8,729,873 B2
(45) Date of Patent: May 20, 2014

(54) DC-TO-DC CONVERTER WITH HIGH-SIDE SWITCH AND LOW-SIDE SWITCH

(75) Inventor: Yuichi Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 256 days.

(21) Appl. No.: 13/232,270

(22) Filed: Sep. 14, 2011

(65) Prior Publication Data

US 2012/0062191 A1    Mar. 15, 2012

(30) Foreign Application Priority Data

Sep. 13, 2010  (JP) ................................. 2010-204295

(51) Int. Cl.
*G05F 1/56* (2006.01)
*G05F 1/565* (2006.01)
*G05F 1/569* (2006.01)

(52) U.S. Cl.
USPC .......................................... 323/271; 323/285

(58) Field of Classification Search
USPC .................... 323/271–285, 312–315
See application file for complete search history.

(56) References Cited

U.S. PATENT DOCUMENTS

| 6,933,711 B2* | 8/2005 | Sutardja et al. ............... 323/283 |
| 8,194,424 B2* | 6/2012 | Stanley ....................... 363/21.17 |
| 2009/0309557 A1* | 12/2009 | Miyamae ....................... 323/234 |
| 2010/0026259 A1 | 2/2010 | Ozaki et al. |
| 2011/0156678 A1* | 6/2011 | Saito et al. ..................... 323/282 |
| 2011/0254524 A1* | 10/2011 | Ishii ............................. 323/282 |
| 2012/0126765 A1* | 5/2012 | Stone et al. .................... 323/283 |
| 2012/0176108 A1* | 7/2012 | Goto ............................. 323/271 |
| 2013/0193942 A1* | 8/2013 | Ishii ............................. 323/282 |

FOREIGN PATENT DOCUMENTS

| JP | 2005-160224 | 6/2005 |
| JP | 2006-166667 | 6/2006 |
| JP | 2007-221922 | 8/2007 |

OTHER PUBLICATIONS

Japanese Office Action for Japanese Application No. 2010-204295 mailed on Jan. 23, 2013.
CN Office Action received in the corresponding CN Application No. 201110252388.0 dated Nov. 26, 2013, and an English translation thereof.

* cited by examiner

*Primary Examiner* — Adolf Berhane
*Assistant Examiner* — Nusrat Quddus
(74) *Attorney, Agent, or Firm* — White & Case LLP

(57) ABSTRACT

In general, according to one embodiment, a DC-to-DC converter includes a high-side switch, a low-side switch, a diode, a high-side controller and a low-side controller. The low-side switch is connected in series with the high-side switch. The diode is connected in parallel with the low-side switch. The high-side controller has a detector for detecting a current of the high-side switch and controls the high-side switch to be turned on or off in accordance with an output of the detector. The low-side controller controls the low-side switch to be turned off when the high-side switch is ON and controls the low-side switch to be turned on or off in accordance with a peak value of the output of the detector when the high-side switch is OFF.

19 Claims, 2 Drawing Sheets

CLK

IQ1

PWM

VH

VL

SEL

VT

DC-TO-DC CONVERTER WITH HIGH-SIDE SWITCH AND LOW-SIDE SWITCH

CROSS-REFERENCE TO RELATED APPLICATIONS

This application is based upon and claims the benefit of priority from the prior Japanese Patent Application No. 2010-204295, filed on Sep. 13, 2010; the entire contents of which are incorporated herein by reference.

FIELD

Embodiments described herein relate generally to a DC-to-DC converter.

BACKGROUND

In a step-down DC-to-DC converter, a synchronous rectification method and a chopper method are used. The synchronous rectification method is a method in which an inductor is driven by alternately turning on or off a high-side switch and a low-side switch. The chopper method is a method in which only the high-side switch is turned on or off.

The chopper method has less switching loss at a small current, but since a low-side element is formed of a diode, a voltage drop by the diode is large, and efficiency at a large current is low. On the other hand, in the synchronous rectification method, since switching is made on the low-side, too, the efficiency at the large current is high, but switching loss is large at the small current, and efficiency is deteriorated. Also, a current of the inductor flows in the opposite direction through the low-side switch at the small current, which might deteriorate efficiency.

DETAILED DESCRIPTION

Figure 1:
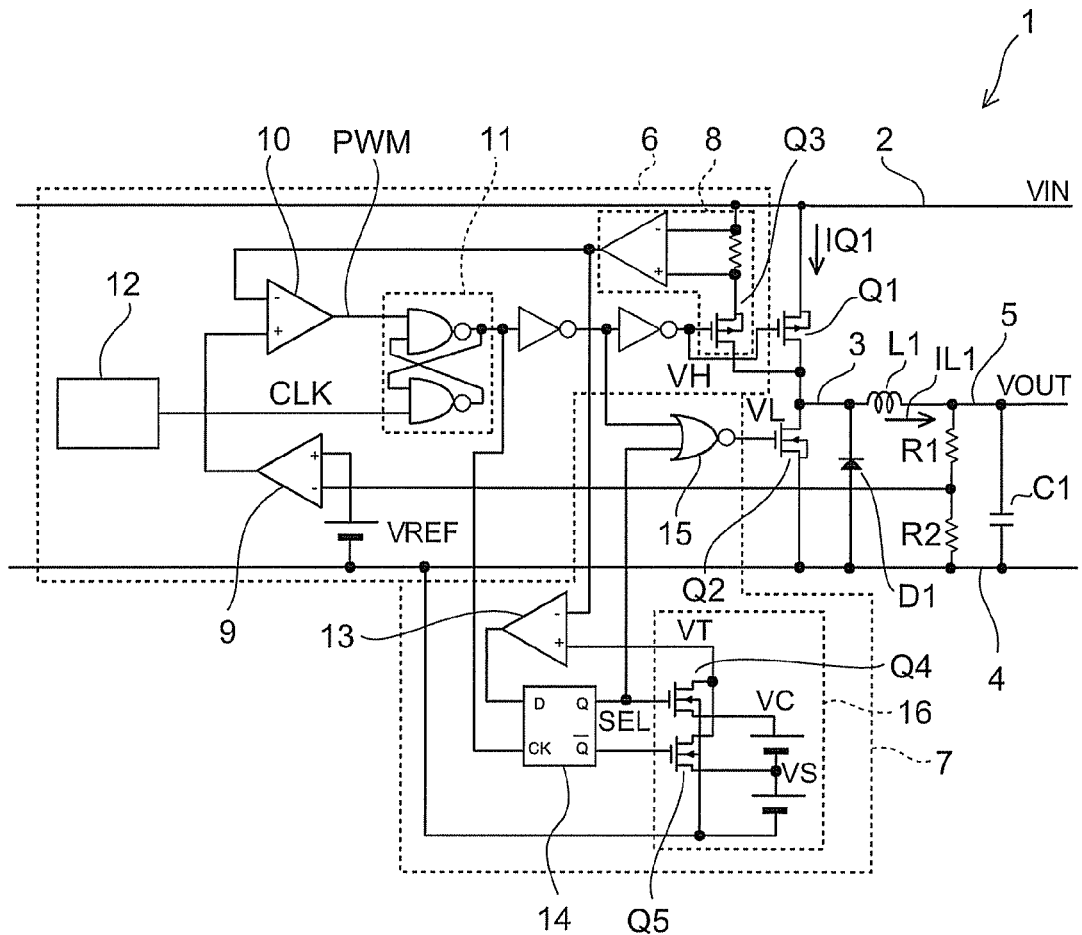
FIG. 1 is a circuit diagram illustrating a configuration of a DC-to-DC converter according to a first embodiment.

In general, according to one embodiment, a DC-to-DC converter includes a high-side switch, a low-side switch, a diode, a high-side controller and a low-side controller. The low-side switch is connected in series with the high-side switch. The diode is connected in parallel with the low-side switch. The high-side controller has a detector for detecting a current of the high-side switch and controls the high-side switch to be turned on or off in accordance with an output of the detector. The low-side controller controls the low-side switch to be turned off when the high-side switch is ON and controls the low-side switch to be turned on or off in accordance with a peak value of the output of the detector when the high-side switch is OFF.

Embodiments will now be described in detail with reference to the drawings. In the specification of the application and the drawings, components similar to those described in regard to a drawing thereinabove are marked with like reference numerals, and a detailed description is omitted as appropriate.

(First Embodiment)

FIG. 1 is a circuit diagram illustrating a configuration of a DC-to-DC converter according to a first embodiment.

The DC-to-DC converter 1 is provided with a high-side switch Q1, a low-side switch Q2 connected in series with the high-side switch Q1, a high-side controller 6 that controls the high-side switch Q1, a low-side controller 7 that controls the low-side switch Q2 and the like. The DC-to-DC converter 1 outputs an output voltage VOUT obtained by lowering a supply voltage VIN.

The high-side switch Q1 is connected between a power line 2 and a drive line 3. The low-side switch Q2 is connected between the drive line 3 and a ground line 4. The low-side switch Q2 is connected in series with the high-side switch Q1.

In FIG. 1, the high-side switch Q1 is constituted by a P-type channel MOSFET (hereinafter PMOS). Also, the low-side switch Q2 is constituted by an N-type channel MOSFET (hereinafter NMOS). However, the high-side switch Q1 may be constituted by NMOS.

One end of an inductor L1 is connected to the high-side switch Q1 and the low-side switch Q2 through the drive line 3. The other end of the inductor L1 is connected to an output line 5. Feedback resistors R1 and R2 and a smoothing capacitor C1 are connected between the output line 5 and the ground line 4, respectively.

The inductor L1 is driven by the high-side switch Q1 through the drive line 3 and generates the output voltage VOUT in the output line 5. The output voltage VOUT is smoothened in the smoothing capacitor C1. Also, by the feedback resistors R1 and R2, a voltage VFB is generated from the output voltage VOUT. The voltage VFB is fed back to the high-side controller 6.

In FIG. 1, the voltage VFB, which is obtained by dividing the output voltage VOUT by the feedback resistors R1 and R2, is fed back to the high-side controller 6. However, it may be so configured that the output voltage VOUT is fed back to the high-side controller 6 as the voltage VFB.

The high-side switch Q1 is controlled to be turned on or off by a high-side control signal VH outputted from the high-side controller 6. Since the high-side switch Q1 is constituted by PMOS, the logic of the high-side control signal VH is negative logic. When the high-side control signal VH is at a low level, the high-side switch Q1 is turned on; when the high-side control signal VH is at a high level, the high-side switch Q1 is turned off.

The low-side switch Q2 is controlled to be turned on or off by a low-side control signal VL outputted from the low-side controller 7. Since the low-side switch Q2 is constituted by NMOS, the logic of the low-side control signal VL is positive logic. When the low-side control signal VL is at a low level, the low-side switch Q2 is turned off; when the low-side control signal VL is at a high level, the low-side switch Q2 is turned on.

A diode D1 is connected to both ends of the low-side switch Q2. The diode D1 is connected in parallel with the low-side switch Q2 between the high-side switch Q1 and the ground line 4. In the diode D1, when the low-side switch Q2 is off, a regenerative current of the inductor L1 flows in the direction from the ground line 4 to the inductor L1. The diode D1 may be a parasitic diode included in the low-side switch Q2.

The high-side controller 6 controls the high-side switch Q1 to be turned on or off so that the voltage VFB fed back from the output voltage VOUT becomes equal to a voltage VREF, which is to be a reference.

The high-side controller 6 compares an error between the voltage VFB and the voltage VREF with a current IQ1 of the high-side switch Q1 and controls the high-side switch Q1 to be turned on or off.

The current IQ1 of the high-side switch Q1 is detected by a detector 8. The detector 8 detects the current IQ1 of the high-side switch Q1 by converting the current of a detection transistor Q3 connected in parallel with the high-side switch Q1 to a voltage. The current of the detection transistor Q3 is in proportion with the current IQ1 of the high-side switch Q1, and the detector 8 outputs a voltage in proportion with the current IQ1.

When the high-side switch Q1 is ON, the current IQ1 of the high-side switch Q1 is equal to a current IL1 of the inductor L1. The detector 8 detects the current IL1 of the inductor L1 by detecting the current IQ1 of the high-side switch Q1.

The error between the voltage VFB and the voltage VREF is amplified by an error amplifier 9. The output of the error amplifier 9 is inputted into a positive input terminal of a second comparator 10. Into a negative input terminal of the second comparator 10, a detected value of the current IQ1 of the high-side switch Q1 is inputted from the detector 8.

If the error inputted into the positive input terminal is larger than the detected value of the current IQ1 inputted into the negative input terminal, the second comparator 10 outputs a high level. Also, if the error inputted into the positive input terminal is smaller than the detected value of the current IQ1 inputted into the negative input terminal, the second comparator 10 outputs a low level.

The output of the second comparator 10 is inputted into one of input terminals of a latch circuit 11 constituted by two NANDs (Negative AND circuits). Into the other input terminal of the latch circuit 11, a clock signal CLK generated in a clock signal oscillator 12 is inputted. The output of the latch circuit 11 is outputted as the high-side control signal VH through a two-stage inverter.

The high-side controller 6 operates in synchronization with the clock signal CLK.

If the clock signal CLK is at a low level, the latch circuit 11 is reset and outputs a low level. The high-side control signal VH becomes a low level, and the high-side switch Q1 is turned on. If the output of the second comparator 10 is at a low level, the latch circuit 11 is set, and the latch circuit 11 outputs a high level. The high-side control signal VH becomes a high level, and the high-side switch Q1 is turned off.

Therefore, if the detected value of the current IQ1 is smaller than the error of the voltage VFB with respect to the voltage VREF, a low level is outputted to the high-side control signal VH, and the high-side switch Q1 is controlled to be turned on. Also, if the detected value of the current IQ1 is larger than the error of the voltage VFB with respect to the voltage VREF, a high level is outputted to the high-side control signal VH, and the high-side switch Q1 is controlled to be turned off.

The low-side controller 7 outputs the low-side control signal VL that controls the low-side switch Q2 to be turned on or off. When the high-side switch Q1 is ON, the low-side control signal VL that turns off the low-side switch Q2 is outputted. Also, when the high-side switch Q1 is OFF, the low-side control signal VL, which controls the low-side switch Q2 to be turned on or off in accordance with a peak value of the current IQ1 of the high-side switch Q1, is outputted.

The current IL1 of the inductor L1 and the current IQ1 of the high-side switch Q1 are varying with time. Thus, it is so configured that the magnitude of the current IL1 of the inductor L1 is detected by the peak value of the current IQ1.

When the high-side switch Qi is OFF, if the low-side switch Q2 is controlled to be turned off, the switch operates in the chopper method. The regenerative current of the inductor L1 flows through the diode D1.

Also, when the high-side switch Q1 is OFF, if the low-side switch Q2 is controlled to be turned on, the switch operates in the synchronous rectification method. The regenerative is current of the inductor L1 flows through the low-side switch Q2.

As described above, the low-side controller 7 selects whether the DC-to-DC converter 1 operates in the chopper method or in the synchronous rectification method. Hereinafter, operation of the DC-to-DC converter in the chopper method will be referred to as a chopper mode, and the operation in the synchronous rectification method will be referred to as a synchronous rectification mode.

Either of the chopper mode and the synchronous rectification mode is selected by a selection signal SEL generated in accordance with the peak value of the current IQ1 of the high-side switch Q1. If the selection signal SEL is at a low level, the mode is the synchronous rectification mode, while if the selection signal SEL is at a high level, the mode is the chopper mode.

As described above, in the chopper method, efficiency at the small current is high but efficiency at the large current is low. Also, in the synchronous rectification method, efficiency at the small current is low and efficiency at the large current is high. A specified value of a peak current when the efficiency of the chopper method becomes equal to the efficiency of the synchronous rectification method is determined by design values of the supply voltage VIN, the output voltage VOUT, the output current and the like of the DC-to-DC converter 1.

Therefore, if the peak value of the current IL1 of the inductor L1 is larger than the specified value, the efficiency is higher in the synchronous rectification method than in the chopper method. Thus, if the peak value of the current IQ1 of the high-side switch Q1 is larger than the specified value, the selection signal SEL falls to a low level, and the mode enters the synchronous rectification mode. If the high-side switch Q1 is OFF, the low-side switch Q2 is controlled to be turned on.

Also, if the peak value of the current ILl. of the inductor L1 is smaller than the specified value, the efficiency is higher in the chopper method than in the synchronous rectification method. Thus, if the peak value of the current IQ1 of the high-side switch Q1 is smaller than the specified value, the selection signal SEL rises to a high level, and the mode enters the chopper mode. If the high-side switch Q1 is OFF, the low-side switch Q2 is controlled to be turned off.

Thus, in the DC-to-DC converter 1, power efficiency can be improved over a wide current region.

If the peak value of the current IQ1 of the high-side switch Q1 is equal to the specified value, control may be made either in the synchronous rectification mode or in the chopper mode.

Also, in the DC-to-DC converter 1, control is made by the detector 8 so as to enter the chopper mode or the synchronous rectification mode in accordance with the peak value of the current IQ1 of the high-side switch Q1.

Detection of the peak value of the high-side switch Q1 is relatively easier than detection of the current of the low-side switch Q2 or detection of zero-cross of the current IL1 of the inductor Li, and the peak value can be detected with accuracy. Thus, drop in an improvement effect of power efficiency by a detection error can be suppressed.

In the step-down DC-to-DC converter, if it operates in the chopper mode, under the condition that the duty ratio of ON of the high-side switch Q1 is 50% or less, a peak value ILpeak of the current IL1 of the inductor L1 at the same output current value indicates a value higher than that in the synchronous rectification mode due to forward voltage of the diode D1.

Figure 2:
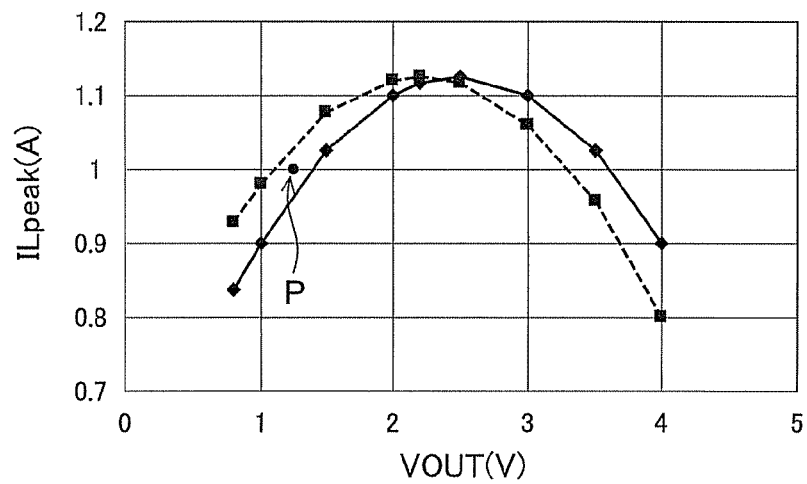
FIG. 2 is a characteristic chart illustrating output voltage dependency of a peak value of an inductor current.

FIG. 2 is a characteristic chart illustrating output voltage dependency of a peak value of an inductor current.

In FIG. 2, the dependency of the peak value ILpeak of the current IL1 of the inductor L1 with respect to the output voltage VOUT is indicated by a broken line in the case of the chopper mode and by a solid line in the case of the synchronous rectification mode, respectively. It is assumed that the supply voltage VIN=5V, the output current is 0.5 A, and the mode is a current continuous mode.

If the duty ratio is defined as a ratio TON/T to a cycle T of a period TON when the high-side switch Q1 is ON, the duty ratio can be substantially expressed as VOUT /VIN . For example, in the case of the supply voltage VIN=5V and the output voltage=2.5V, the duty ratio becomes substantially 50%.

As illustrated in FIG. 2, if the output voltage VOUT=2.5V or less (if the duty ratio is 50% or less), the peak value ILpeak of the current IL1 of the inductor L1 with respect to a certain output voltage VOUT is larger in the chopper mode than in the synchronous rectification mode.

For example, it is assumed that the output voltage VOUT=1.2V, and the specified value with respect to the peak value ILpeak of the current IL1 of the inductor L1 is 1.0 A (P point in FIG. 2).

In the low-side controller 7, the peak value ILpeak of the current IL1 of the inductor L1 is detected from the current IQ1 of the high-side switch Q1, and if the detected value is lower than the specified value 1.0 A, the chopper mode is selected. If the detected value is larger than the specified value 1.0 A, the synchronous rectification mode is selected.

Therefore, in the case of the operation in the synchronous rectification mode, for example, the peak value ILpeak is smaller than the specified value 1.0 A, and the low-side controller 7 selects the chopper mode. However, if the mode of operation is changed to the chopper mode in the subsequent cycle, the peak value ILpeak is larger than the specified value 1.0 A, and the low-side controller 7 selects the synchronous rectification mode. As described above, in a state at the same output current, the chopper mode and the synchronous rectification mode might be selected alternately in each cycle, which causes fluctuation in the output voltage.

In order to prevent the above situation, in the low-side controller 7, it is configured such that the peak value at switching from the synchronous rectification mode to the chopper mode is set smaller than the peak value of the current at switching from the chopper mode to the synchronous rectification mode. As a result, a stable output voltage can be supplied to a certain output current.

In the low-side controller 7, the detected value of the current IQ1 of the high-side switch Q1 is inputted to a first comparator 13 having two threshold values. The threshold values are set which are different between the case in which the synchronous rectification mode is selected and the case in which the chopper mode is selected for the peak value of the current IQ1 of the high-side switch Q1. Therefore, hysteresis is given to the configuration with a peak value which changes from the synchronous rectification mode to the chopper mode and a peak value which changes from the chopper mode to the synchronous rectification mode.

A voltage generation circuit 16 outputs a threshold value (first threshold value) VC of the chopper mode or a threshold value (second threshold value) VS of the synchronous rectification mode as a reference voltage VT. The threshold value VC of the chopper mode is outputted as the reference voltage VT through a first switch Q4. The threshold value VS of the synchronous rectification mode is outputted as the reference voltage VT through a second switch Q5.

Into a gate of the first switch Q4, the selection signal SEL is inputted. Into a gate of the second switch Q5, a negative signal of the selection signal SEL is inputted. Each of the first and second switches Q4 and Q5 is constituted by NMOS.

Therefore, the voltage generation circuit 16 outputs the threshold value VC of the chopper mode as the reference voltage VT when the selection signal SEL is at a high level. Also, the circuit outputs the threshold value VS of the synchronous rectification mode as the reference voltage VT when the selection signal SEL is at a low level.

If the selection signal SEL is at a high level and in the chopper mode, the first switch Q4 is turned on, and the second switch Q5 is turned off. The reference voltage VT of the first comparator 13 becomes the threshold value VC of the chopper mode. If the selection signal SEL is at a low level and in the synchronous rectification mode, the first switch Q4 is turned off, and the second switch Q5 is turned on. The reference voltage VT of the first comparator 13 becomes the threshold value VS of the synchronous rectification mode.

As described above, as the reference voltage VT of the first comparator 13, VC is inputted to the positive input terminal of the first comparator 13 in the chopper mode and VS is inputted in the synchronous rectification mode. However, it is VC>VS. Also, into the negative input terminal of the first comparator 13, the detected value of the current IQ1 of the high-side switch Q1 is inputted as a comparison signal. The output of the first comparator 13 is inputted into a holding circuit 14.

The holding circuit 14 is constituted by a D-type flip-flop circuit (DFF). Into a clock terminal CK of the holding circuit 14, an output of the latch circuit 11 of the high-side controller 6 is inputted. To a terminal Q of the holding circuit 14, the selection signal SEL that selects either of the chopper mode or the synchronous rectification mode is outputted. The selection signal SEL selects the chopper mode when being at a high level and the synchronous rectification mode when being at a low level.

In FIG. 1, the holding circuit 14 is constituted by the DFF. However, it is only necessary that the holding circuit 14 can update a signal inputted into the input terminal and hold it at rising or falling of the signal inputted into the clock terminal CK.

When the high-side switch Q1 is turned off, the output of the latch circuit 11 to be inputted into the clock terminal CK of the holding circuit 14 rises to a high level. In the holding circuit 14, a comparison result between the peak value of the current IQ1 of the high-side switch Q1 and the reference voltage VT (=VC or VS) is held.

If the peak value of the current IQ1 of the high-side switch Q1 is larger than the reference voltage VT, a low level is outputted to the selection signal SEL. If the peak value of the current IQ1 of the high-side switch Q1 is smaller than the reference voltage VT, a high level is outputted to the selection signal SEL.

Into one of the input terminals of a negative logical sum circuit (NOR) 15, a signal obtained by inverting the high-side control signal VH is inputted, and into the other input terminal of the NOR 15, the selection signal SEL is inputted. The output of the NOR 15 is an output of the low-side controller 7 and controls the low-side switch Q2 as the low-side control signal VL.

The low-side controller 7 controls the low-side switch Q2 to be turned off or on in accordance with the peak value of the current IO1 of the high-side switch Q1 when the high-side switch Q1 is OFF. The DC-to-DC converter 1 operates in the chopper mode or in the synchronous rectification mode.

If the peak value of the current IQ1 is smaller than the specified value, the low-side controller 7 controls the low-side switch Q2 to be turned off. The DC-to-DC converter 1 operates in the chopper mode. Also, if the peak value of the current IQ1 is larger than the specified value, the low-side controller 7 controls the low-side switch Q2 to be turned on. The DC-to-DC converter 1 operates in the synchronous control mode.

Thus, in the DC-to-DC converter 1, power efficiency can be improved over a wide current region.

Figure 3A:
FIGS. 3A to 3G are timing charts of main signals of the DC-to-DC converter.
Figure 3B:
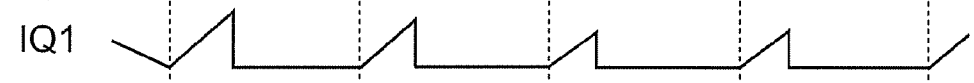
Figure 3C:
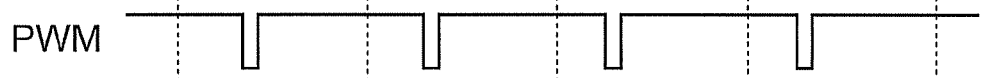
Figure 3D:
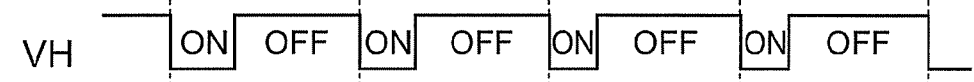
Figure 3E:
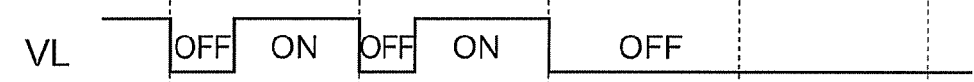
Figure 3F:
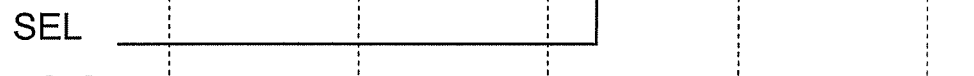
Figure 3G:

FIGS. 3A to 3G are timing charts of main signals of the DC-to-DC converter, in which FIG. 3A shows the clock signal CLK, FIG. 3B shows the current IQ1 of the high-side switch, FIG. 3C shows an output signal PWM of the second comparator, FIG. 3D shows the high-side control signal VH, FIG. 3E shows the low-side control signal VL, FIG. 3F shows the selection signal SEL, and FIG. 3G shows the reference voltage VT.

In FIG. 3D, the fact that the high-side switch Q1 is controlled to be turned on or off is indicated by "ON" or "OFF", respectively. In FIG. 3E, the fact that the low-side switch Q2 is controlled to be turned on or off is indicated by "ON" or "OFF", respectively.

Subsequently, by referring to FIGS. 1 and 3A to 3G, an operation of the DC-to-DC converter 1 will be described. The selection signal SEL is assumed to be at a low level. Therefore, the reference voltage VT is the threshold value VS of the synchronous rectification mode.

The clock signal CLK is a negative pulse signal having a short low-level period (FIG. 3A). One cycle of the clock signal CLK is a cycle, and the DC-to-DC converter 1 operates in synchronization with the clock signal CLK.

When the clock signal CLK falls from a high level to a low level (FIG. 3A), the latch circuit 11 is reset and outputs a low level.

The high-side control signal VH falls to a low level (FIG. 3D), and the high-side switch Q1 is turned on. Since negative of the high-side control signal VH is at a high level, the low-side control signal VL falls to a low level regardless of the selection signal SEL (FIG. 3E), and the low-side switch Q2 is turned off.

Since the high-side switch Qi is ON, the current IQ1 of the high-side switch Q1 is increased (FIG. 3B). When the current IQ1 of the high-side switch Q1 exceeds the output of the error amplifier 9, the output signal PWM of the second comparator 10 falls to a low level (FIG. 3C). The latch circuit 11 is set and outputs a high level.

The high-side control signal VH changes to a high level (FIG. 3D), and the high-side switch Q1 is turned off. The output signal PWM of the second comparator 10 returns to the high level (FIG. 3C).

Also, since the latch circuit 11 was set and the output of the latch circuit 11 changes from the low level to the high level, the output of the holding circuit 14 is updated.

If the peak value of the current IQ1 of the high-side switch Q1 is larger than the reference voltage VT, the selection signal SEL is at a low level (FIG. 3F). Since the negative of the high-side control signal VH is at a low level and the selection signal SEL is at a low level, the low-side control signal VL rises to a high level (FIG. 3E).

The low-side switch Q2 is turned on, and the DC-to-DC converter 1 enters the synchronous rectification mode.

Also, since the selection signal SEL is at a low level, the reference voltage VT becomes the threshold value VS of the synchronous rectification mode.

On the other hand, when the output of the holding circuit 14 is updated, if the peak value of the current IQ1 of the high-side switch Q1 is smaller than the reference voltage VT, the selection signal SEL rises to a high level (FIG. 3F). Since the negative of the high-side control signal VH is at a low level and the selection signal SEL is at a high level, the low-side control signal VL falls to a low level (FIG. 3E).

The low-side switch Q2 is turned off, and the DC-to-DC converter 1 enters the chopper mode.

Also, since the selection signal SEL is at .a high level, the reference voltage VT becomes the threshold value VC of the chopper mode.

At the subsequent fall of the clock signal CLK, the latch circuit 11 is reset. The similar operation is repeated in the subsequent cycle and after.

As described above, the chopper mode and the synchronous rectification mode are switched in accordance with the peak value of the current IQ1 of the high-side switch Q1. That is, if the peak value of the current IQ1 of the high-side switch Q1 is smaller than the reference voltage VT, the mode enters the chopper mode, while if the peak value is larger than the reference voltage VT, the mode enters the synchronous rectification mode.

Therefore, power efficiency can be improved over a wide current region.

Also, the reference voltages VT (=VC or VS) are set which are different between the case in which the low-side switch Q2 is turned off and the case in which the low-side switch Q2 switch is turned on for the peak value of the current IQ1 of the high-side switch Q1 so as to give hysteresis to the value at which the low-side switch Q2 is turned on or off.

Therefore, voltage fluctuation when the mode is switched between the chopper mode and the synchronous rectification mode for a certain output current can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A DC-to-DC converter comprising:
   a high-side switch;
   a low-side switch connected in series with the high-side switch;
   a diode connected in parallel with the low-side switch;
   a high-side controller having a detector for detecting a current of the high-side switch and controlling the high-side switch to be turned on or off in accordance with an output of the detector;
   a low-side controller controlling the low-side switch to be turned off when the high-side switch is ON and controlling the low-side switch to be turned on or off in accordance with a peak value of the output of the detector when the high-side switch is OFF; and
   the peak value of the output of the detector controlling the low-side switch from ON to OFF is set smaller than the peak value of the output of the detector controlling the low-side switch from OFF to ON.

2. The converter according to claim 1, wherein
the low-side controller controls the low-side switch to be turned off when the peak value of the output of the detector is smaller than a specified value and controls the low-side switch to be turned on when the peak value of the output of the detector is larger than the specified value.

3. The converter according to claim 1, wherein
the low-side controller has:
    a holding circuit holding a selection signal controlling the low-side switch to be turned on or off when the high-side switch is OFF; and
    a first comparator comparing the output of the detector with a reference voltage and outputting the result to the holding circuit, and
the selection signal held by the holding circuit is updated to an output signal of the first comparator when the high-side switch is turned off.

4. The converter according to claim 3, wherein
the holding circuit is a D-type flip-flop circuit.

5. The converter according to claim 3, wherein
the low-side controller further has a logic circuit, the logic circuit masks the output of the high-side controller with the selection signal.

6. The converter according to claim 1, wherein
the high-side controller sets a duty ratio of ON of the high-side switch to 50% or less.

7. The converter according to claim 1, wherein
the detector has a detection transistor connected in parallel with the high-side switch.

8. The converter according to claim 1, wherein
the peak value of the output of the detector is an output of the detector immediately before the high-side switch is turned off.

9. A DC-to-DC converter comprising:
a high-side switch;
a low-side switch connected in series with the high-side switch;
a diode connected in parallel with the low-side switch;
a high-side controller having a detector for detecting a current of the high-side switch and controlling the high-side switch to be turned on or off in accordance with an output of the detector; and
a low-side controller controlling the low-side switch to be turned off when the high-side switch is ON and controlling the low-side switch to be turned on or off in accordance with a peak value of the output of the detector when the high-side switch is OFF;
wherein the low-side controller has:
    a holding circuit holding a selection signal controlling the low-side switch to be turned on or off when the high-side switch is OFF; and
    a first comparator comparing the output of the detector with a reference voltage and outputting the result to the holding circuit, and
the selection signal held by the holding circuit is updated to an output signal of the first comparator when the high-side switch is turned off.

10. The converter according to claim 9, wherein
the low-side controller further has a voltage generation circuit outputting a first threshold value or a second threshold value lower than the first threshold value as the reference voltage in accordance with the selection signal.

11. The converter according to claim 10, wherein
the low-side controller further has:
    a first transistor being controlled to be turned on or off by the selection signal and outputting the first threshold value when being ON; and
    a second transistor being controlled to be turned on or off by a negative signal of the selection signal and outputting the second threshold value when being ON.

12. The converter according to claim 10, wherein
the high-side controller sets a duty ratio of ON of the high-side switch to 50% or less.

13. The converter according to claim 1, wherein
the high-side controller has a latch circuit, the latch circuit is reset with a clock signal.

14. The converter according to claim 1, further comprising:
an inductor having one end connected to the high-side switch;
a smoothing capacitor connected between the other end of the inductor and the ground; and
a feedback resistor connected between the other end of the inductor and the ground and feeding back the output voltage to the high-side controller.

15. A DC-to-DC converter comprising
a high-side switch;
a low-side switch connected in series with the high-side switch;
a diode connected in parallel with the low-side switch;
a high-side controller having a detector for detecting a current of the high-side switch and controlling the high-side switch to be turned on or off in accordance with an output of the detector; and
a low-side controller controlling the low-side switch to be turned off when the high-side switch is ON and controlling the low-side switch to be turned on or off in accordance with a peak value of the output of the detector when the high-side switch is OFF; wherein
the low-side controller controls the low-side switch to be turned off when the peak value of the output of the detector is smaller than a specified value and controls the low-side switch to be turned on when the peak value of the output of the detector is larger than the specified value; and wherein
the peak value of the output of the detector controlling the low-side switch from ON to OFF is set smaller than the peak value of the output of the detector controlling the low-side switch from OFF to ON.

16. The converter according to claim 15, wherein
the low-side controller has:
    a holding circuit holding a selection signal controlling the low-side switch to be turned on or off when the high-side switch is OFF; and
    a first comparator comparing the output of the detector with a reference voltage and outputting the result to the holding circuit, and
the selection signal held by the holding circuit is updated to an output signal of the first comparator when the high-side switch is turned off.

17. The converter according to claim 16, wherein
the low-side controller further has a voltage generation circuit outputting a first threshold value or a second threshold value lower than the first threshold value as the reference voltage in accordance with the selection signal.

18. A DC-to-DC converter comprising
a high-side switch;
a low-side switch connected in series with the high-side switch;

a diode connected in parallel with the low-side switch;
a high-side controller having a detector for detecting a current of the high-side switch and controlling the high-side switch to be turned on or off in accordance with an output of the detector; and
a low-side controller controlling the low-side switch to be turned off when the high-side switch is ON and controlling the low-side switch to be turned on or off in accordance with a peak value of the output of the detector when the high-side switch is OFF; wherein
the low-side controller controls the low-side switch to be turned off when the peak value of the output of the detector is smaller than a specified value and controls the low-side switch to be turned on when the peak value of the output of the detector is larger than the specified value; and
wherein the low-side controller has:
   a holding circuit holding a selection signal controlling the low-side switch to be turned on or off when the high-side switch is OFF; and
   a first comparator comparing the output of the detector with a reference voltage and outputting the result to the holding circuit, and
the selection signal held by the holding circuit is updated to an output signal of the first comparator when the high-side switch is turned off.

19. The converter according to claim 18, wherein
the low-side controller further has a voltage generation circuit outputting a first threshold value or a second threshold value lower than the first threshold value as the reference voltage in accordance with the selection signal.

* * * * *